(12) United States Patent
Matsuda et al.

(10) Patent No.: US 9,662,601 B2
(45) Date of Patent: May 30, 2017

(54) BLENDED FILAMENT NONWOVEN FABRIC

(75) Inventors: Yasushi Matsuda, Shiga (JP); Junji Iwata, Shiga (JP); Mitsuru Kojima, Shiga (JP); Takafumi Ito, Shiga (JP)

(73) Assignees: JNC CORPORATION, Tokyo (JP); JNC FIBERS CORPORATION, Tokyo (JP)

( * ) Notice: Subject to any disclaimer, the term of this patent is extended or adjusted under 35 U.S.C. 154(b) by 0 days.

(21) Appl. No.: 14/238,475

(22) PCT Filed: Aug. 8, 2012

(86) PCT No.: PCT/JP2012/070232
§ 371 (c)(1),
(2), (4) Date: Mar. 5, 2014

(87) PCT Pub. No.: WO2013/024770
PCT Pub. Date: Feb. 21, 2013

(65) Prior Publication Data
US 2014/0165515 A1   Jun. 19, 2014

(30) Foreign Application Priority Data
Aug. 12, 2011   (JP) .................. 2011-176541

(51) Int. Cl.
| | | |
|---|---|---|
| *B01D 39/16* | (2006.01) | |
| *D04H 3/016* | (2012.01) | |
| *D04H 3/153* | (2012.01) | |
| *D04H 1/56* | (2006.01) | |
| *B01D 46/00* | (2006.01) | |
| *D04H 3/007* | (2012.01) | |
| *B03C 3/28* | (2006.01) | |

(52) U.S. Cl.
CPC ....... *B01D 39/163* (2013.01); *B01D 46/0023* (2013.01); *B03C 3/28* (2013.01); *D04H 1/56* (2013.01); *D04H 3/007* (2013.01); *D04H 3/016* (2013.01); *D04H 3/153* (2013.01); *B01D 2239/064* (2013.01); *B01D 2239/0622* (2013.01); *B01D 2239/1233* (2013.01); *Y10T 442/609* (2015.04)

(58) Field of Classification Search
CPC .... B01D 39/163; B01D 46/0023; B03C 3/28; D04H 1/56; D04H 3/007; D04H 3/016; D04H 3/153
USPC .......................................................... 55/482
See application file for complete search history.

(56) References Cited

U.S. PATENT DOCUMENTS

| | | | | |
|---|---|---|---|---|
| RE28,102 E | * | 8/1974 | Mayhew | 128/206.19 |
| 4,116,738 A | * | 9/1978 | Pall | 156/167 |
| 4,127,706 A | * | 11/1978 | Martin et al. | 429/122 |
| 4,623,438 A | * | 11/1986 | Felton et al. | 204/168 |
| 5,620,785 A | * | 4/1997 | Watt et al. | 428/219 |
| 5,738,775 A | * | 4/1998 | Nagai et al. | 204/632 |
| 5,910,277 A | * | 6/1999 | Ishino et al. | 264/127 |
| 5,935,883 A | | 8/1999 | Pike | |
| 6,548,432 B1 | | 4/2003 | Hisada et al. | |
| 6,554,881 B1 | * | 4/2003 | Healey | 55/528 |
| 6,818,130 B1 | * | 11/2004 | Varriale et al. | 210/266 |
| 7,780,904 B2 | | 8/2010 | Hisada et al. | |
| 7,902,096 B2 | | 3/2011 | Brandner et al. | |
| 7,968,176 B2 | * | 6/2011 | Umezu et al. | 428/219 |
| 8,506,871 B2 | | 8/2013 | Brandner et al. | |
| 2007/0284776 A1 | | 12/2007 | Hisada et al. | |
| 2008/0026659 A1 | | 1/2008 | Brandner et al. | |
| 2009/0007340 A1 | * | 1/2009 | Obernyer et al. | 5/698 |
| 2010/0201041 A1 | | 8/2010 | Brandner et al. | |
| 2011/0196327 A1 | * | 8/2011 | Chhabra et al. | 604/367 |
| 2012/0097037 A1 | * | 4/2012 | Matsuda et al. | 96/75 |

FOREIGN PATENT DOCUMENTS

| | | |
|---|---|---|
| CN | 1287584 | 3/2001 |
| CN | 1439328 | 9/2003 |
| CN | 1461363 | 12/2003 |
| CN | 101495208 | 7/2009 |
| EP | 2452737 | 5/2012 |
| JP | H05-279947 | 10/1993 |
| JP | 09-119050 | 5/1997 |

(Continued)

OTHER PUBLICATIONS

Horiuchi et al., JP 10-251960, English Machine Translation, Translated Oct. 17, 2014.*
Tanaka et al., JP 2000-073270, English Machine Translation, Translated Oct. 18, 2014.*
Translaiton of JP 2006-037295, Espacenet Patent Translate, All Pages, Translated Mar. 18, 2015 http://translationportal.epo.org/emtp/translate?ACTION=description-retrieval&COUNTRY=JP&ENGINE=google&FORMAT=docdb&KIND=A&LOCALE=en_EP&NUMBER=2006037295&OPS=jp. espacenet.com/ops&SRCLANG=ja&TRGLANG=en&PDF=true.*
"International Search Report (Form PCT/ISA/210)", mailed on Nov. 13, 2012, with English translation thereof, p. 1-p. 3.
"Office Action of Japan Counterpart Application", mailed on May 29, 2013, p. 1-p. 3.

(Continued)

*Primary Examiner* — Amber R Orlando
*Assistant Examiner* — Britanny Precht
(74) *Attorney, Agent, or Firm* — Jianq Chyun IP Office

(57) ABSTRACT

The nonwoven fabric is a blended filament nonwoven fabric including a blend of two types of filaments, wherein the two types of filaments are constituted of thermoplastic resins different from each other, an average fiber diameter obtained by dividing the total value of fiber diameters of the filaments present in the nonwoven fabric by the number of the constituent filaments is 0.1 to 10 μm, and the nonwoven fabric has a specific volume of 12 cm$^3$/g or more; the blended filament nonwoven fabric, wherein the ratio of the number of constituent filaments having fiber diameters of 0.1 to 3 μm is 50% or more of the filaments constituting the nonwoven fabric, and the ratio of the number of constituent filaments having fiber diameters exceeding 3 μm is 50% or less of the filaments constituting the nonwoven fabric; or the nonwoven fabric is produced by a melt-blowing process.

11 Claims, No Drawings

(56) References Cited

FOREIGN PATENT DOCUMENTS

| | | |
|---|---|---|
| JP | 10-251960 | 9/1998 |
| JP | 2000-073270 | 3/2000 |
| JP | 2001-146669 | 5/2001 |
| JP | 2002-242069 | 8/2002 |
| JP | 2006-037295 | 2/2006 |
| JP | 4142903 | 9/2008 |
| WO | 2008/053741 | 5/2008 |
| WO | 2011004696 | 1/2011 |

OTHER PUBLICATIONS

"Office Action of Japan Counterpart Application", mailed on Oct. 7, 2013, p. 1-p. 2.
"The Extended European Search Report", issued on Mar. 31, 2015, pp. 1-5.

\* cited by examiner

BLENDED FILAMENT NONWOVEN FABRIC

CROSS-REFERENCE TO RELATED APPLICATION

This application is a 371 application of an international PCT application serial no. PCT/JP2012/070232, filed on Aug. 8, 2012, which claims the priority benefit of Japan application no. 2011-176541, filed on Aug. 12, 2011. The entirety of each of the above-mentioned patent applications is hereby incorporated by reference herein and made a part of this specification.

TECHNICAL FIELD

The present invention relates to a blended filament nonwoven fabric. More specifically, the present invention relates to a blended filament nonwoven fabric which includes a blend of two types of filaments obtained by using thermoplastic resins different from each other and which is high in bulk and good in texture. In particular, the present invention relates to a blended filament nonwoven fabric which has a low pressure loss and a high collection efficiency and can be used for a long period when used as a filter.

BACKGROUND ART

Conventionally, sheets made of nonwoven fabrics have often been used as air filters for removing fine dust such as pollen and fine particles. Such an air filter is required to have a capability of highly efficiently collecting dust and have such a low pressure loss that an intake resistance occurring when gas passes through the air filter is small. These air filters make it possible to collect fine dust such as pollen and fine particles by physical action as well as electrostatic attraction and the like by forming a dense matrix of fibers having fine fiber diameters and by electret-processing the filters.

As these air filters, nonwoven fabrics made of filaments having average fiber diameters of 15 μm or less are often used to form the dense matrices.

As nonwoven fabrics used as filters, melt-blown nonwoven fabrics having fine fiber diameters are often employed. A filter made of a melt-blown nonwoven fabric has a fine fiber diameter and hence has a dense structure, and achieves a high collection efficiency of fine dust. Hence, melt-blown nonwoven fabrics are suitably used as materials for filters. However, most filters made of melt-blown nonwoven fabrics are generally low in bulk and paper-like, and are difficult to use as filters for long periods because the pressure loss increases rapidly in the use. Patent Document 1 proposes a bulky composite fiber nonwoven fabric made of thermoplastic composite fibers. This nonwoven fabric is aimed at pleating suitability. The bulk of the composite fiber nonwoven fabric is increased by partially aggregating the fibers during spinning so that a lot of fusion bonded fiber aggregates are made present in the nonwoven fabric. Hence, the fiber aggregates cannot be dispersed uniformly, and a difference in density is created in the nonwoven fabric. Hence, the nonwoven fabric tends to have a low collection efficiency, although the pressure loss is low.

Meanwhile, Patent Document 2 proposes a melt-blown nonwoven fabric being obtained by blending fibers having different diameters and having a low pressure loss and a high collection performance. The melt-blown nonwoven fabric tends to have a lower pressure loss than melt-blown nonwoven fabrics made of fine fibers. However, since the melt-blown nonwoven fabric is a nonwoven fabric made of fibers of a single component resin, the nonwoven fabric has a high density and an insufficiently lowered pressure loss.

CITATION LIST

Patent Literatures

Patent Literature 1: Japanese Patent No. 4142903
Patent Literature 2: Japanese Patent Application Publication No. 2006-37295

SUMMARY OF INVENTION

Technical Problems

In view of the problems of the above-described conventional technologies, an object of the present invention is to provide a nonwoven fabric being high in bulk and good in texture and having both a capability of highly efficiently collecting dust and the like and such a low pressure loss characteristic that the intake resistance occurring when gas passes through a filter is low.

Here, a low pressure loss or low in pressure loss means that the intake resistance occurring when gas passes through a filter is low, and means such a characteristic that the intake resistance can be maintained relatively low even in a long term use, in other words, such a characteristic that the increase in pressure loss can be suppressed.

Solution to Problems

To achieve the above-described object, the present inventors have made earnest studies. As a result, the present inventors have found that the above-described problems can be solved by forming a nonwoven fabric obtained by blending two types of filaments, wherein the two types of filaments are constituted of thermoplastic resins different from each other, the average fiber diameter of the filaments constituting the nonwoven fabric is adjusted within a specific range, and the nonwoven fabric is a bulky nonwoven fabric having a specific volume of a certain value or higher. Based on this finding, the present invention has been completed.

Accordingly, contents of the present invention are as follows.

[1] A blended filament nonwoven fabric, including a blend of two types of filaments, wherein the two types of filaments are constituted of thermoplastic resins different from each other, an average fiber diameter obtained by dividing the total value of fiber diameters of the filaments present in the nonwoven fabric by the number of the constituent filaments is 0.1 to 10 μm, and the nonwoven fabric has a specific volume of 12 $cm^3/g$ or more.

[2] The blended filament nonwoven fabric according to [1], wherein the ratio of the number of constituent filaments having fiber diameters of 0.1 to 3 μm is 50% or more of the filaments constituting the nonwoven fabric, and the ratio of the number of constituent filaments having fiber diameters exceeding 3 μm is 50% or less of the filaments constituting the nonwoven fabric.

[3] The blended filament nonwoven fabric according to [1] or [2], wherein the nonwoven fabric is produced by a melt-blowing process.

[4] The blended filament nonwoven fabric according to any one of [1] to [3], wherein the two types of filaments are each mainly constituted of a polyolefin.

[5] The blended filament nonwoven fabric according to any one of [1] to [3], wherein the two types of filaments are filaments mainly constituted of a polyolefin and filaments mainly constituted of a polyester.

[6] A filter obtained by using the blended filament nonwoven fabric according to any one of [1] to [5].

[7] An air filter obtained by electret-processing the blended filament nonwoven fabric according to any one of [1] to [5].

[8] A filter including: the filter according to [6] or the air filter according to [7]; and another nonwoven fabric stacked on at least one surface of the filter or the air filter and integrated with the filter or the air filter.

Advantageous Effects of Invention

When used as a filter, the blended filament nonwoven fabric of the present invention has a low pressure loss and a high collection efficiency, and the increase in pressure loss can be suppressed for a long period. The blended filament nonwoven fabric of the present invention is high in bulk and good in texture. Because of the low pressure loss, the high collection efficiency, and the small increase in pressure loss, the blended filament nonwoven fabric of the present invention is useful as a prefilter and a filter of middle to high performance classes.

DESCRIPTION OF EMBODIMENTS

Hereinafter, the present invention will be described in detail.

A blended filament nonwoven fabric of the present invention includes a blend of two types of filaments obtained by using thermoplastic resins different from each other, wherein an average fiber diameter of the filaments constituting the nonwoven fabric is 0.1 to 10 μm, and the nonwoven fabric has a specific volume of 12 cm$^3$/g or more. Hereinafter, the two types of filaments are also referred to as filaments A1 and filaments A2. The terms "blend, blending, and blended" mean that the two types of filaments obtained by using the different thermoplastic resins are mixed with each other at a spinning stage, and are in a substantially uniformly intermingled state.

In the blended filament nonwoven fabric of the present invention, the filaments are blended so that an average fiber diameter obtained by dividing the total value of fiber diameters of the filaments present in the nonwoven fabric by the number of the constituent filaments can be within the range from 0.1 to 10 μm. An average fiber diameter of 0.1 μm or more facilitates the production, results in a high productivity, and is preferable in terms of costs. Meanwhile, an average fiber diameter of 0 μm or less leads to a sufficient collection efficiency. The average fiber diameter is further preferably 0.3 to 7 μm. An average fiber diameter in such a range can be achieved by setting various conditions, as appropriate, in blending means, for example, in a melt-blowing process.

The two types of filaments A1 and filaments A2 are constituted of thermoplastic resins different from each other, and the combination of the two types of thermoplastic resins is not particularly limited, as long as the thermoplastic resins can be spun. For example, it is possible to employ an appropriate combination selected from polyethylenes such as high-density polyethylene, low-density polyethylene, and linear low-density polyethylene; polypropylene-based polyolefins such as propylene homopolymer and copolymers of propylene with one or two selected from ethylene and α-olefins; polyamides; polyesters such as polyethylene terephthalate, polybutylene terephthalate, low-melting point polyesters obtained by copolymerizing a diol with terephthalic acid/isophthalic acid or the like, and polyester elastomers; fluororesins; mixtures of any ones of the above-described resins; and the like. In addition, other components may be copolymerized, as long as properties of the polymer are not impaired.

To the thermoplastic resins constituting the filaments A1 and A2, an antioxidant, a photo-stabilizer, an ultraviolet absorber, a neutralizing agent, a nucleating agent, an epoxy stabilizer, a lubricant, an antibacterial agent, a flame retardant, a pigment, a plasticizer, another thermoplastic resin, and the like can be added within a range not impairing effects of the present invention.

It is preferable that at least one of the thermoplastic resins constituting the filaments A1 and A2 contain at least one selected from the group consisting of hindered amine-based compounds for improving the weather-resistance and, in the use as a filter, for improving the electret performance. The hindered amine-based compounds include poly[(6-(1,1,3,3-tetramethylbutyl)imino-1,3,5-triazine-2,4-diyl)((2,2,6,6-tetramethyl-4-piperidyl)imino)hexamethylene((2,2,6,6-tetramethyl-4-piperidyl)imino)] (CHIMASSORB 944 LD manufactured by Ciba-Geigy), dimethyl succinate-1-(2-hydroxyethyl)-4-hydroxy-2,2,6,6-tetramethylppiperidine polycondensate (TINUVIN 622 LD manufactured by Ciba Specialty Chemicals), 2-(3,5-di-t-butyl-4-hydroxybenzyl)-2-n-butylmalonic acid bis(1,2,2,6,6-pentamethyl-4-piperidyl) (TINUVIN 144 manufactured by Ciba Specialty Chemicals), and the like.

The content of the hindered amine-based compound mixed with the filaments A1 or the filaments A2 is not particularly limited, and is desirably mixed so that the content in the blended filament nonwoven fabric can be in the range from 0.5 to 5% by mass. When the content of the hindered amine-based compound in the blended filament nonwoven fabric is 0.5% by mass or more, weather-resistance and electret performance can be exhibited sufficiently. Meanwhile, a content of the hindered amine-based compound of 5% by mass or less leads to a good productivity and is preferable in terms of costs.

In the present invention, it is preferable that the thermoplastic resins constituting the filaments A1 and the filaments A2 be a combination of thermoplastic resins having different shear viscosities. When the difference is expressed by a numeric value obtained by dividing the higher shear viscosity value of the shear viscosity values of the thermoplastic resins constituting the filaments A1 and the filaments A2 by the lower shear viscosity value, the difference is preferably 1.5 times or more, and further preferably 2 times or more.

The thermoplastic resins constituting the filaments A1 and the filaments A2 preferably mainly contain olefins, because the electret performance is especially exhibited in the use as a filter. Moreover, among polyolefins, one of the thermoplastic resins is preferably a polypropylene having heat resistance and being easily spun into fine fibers to improve the collection performance, and it is preferable to select, as the other thermoplastic resin, a polyethylene, in particular, a polyethylene having a higher shear viscosity than the polypropylene to increase the specific volume. In addition, other components may be copolymerized within the range not imparting properties of the polymers.

The thermoplastic resins constituting the filaments A1 and the filaments A2 are preferably as follows to maintain the high bulk during use as a filter. Specifically, one of the thermoplastic resins preferably mainly contains a polyolefin to exhibit an electret performance. Among polyolefins, a polypropylene having heat resistance and being easily spun into fine fibers is preferable. The other one is preferably a thermoplastic resin mainly containing a polyester. Among polyesters, a polyethylene terephthalate is preferable. Among polyethylene terephthalates, it is preferable to select a polyethylene terephthalate having a higher shear viscosity than the polypropylene. In addition, other components may be copolymerized within the range not imparting properties of the polymers. Note that, in the present invention, the term "mainly contain" or the term "mainly constituted of" means that, among the constituents, the constituent accounts for the largest proportion of the total amount of the constituents and the like.

The fiber diameters of the filaments constituting the blended filament nonwoven fabric of the present invention are not particularly limited, and it is preferable that the ratio of the number of constituent filaments having fiber diameters of 0.1 to 3 μm be 50% or more, and the ratio of the number of constituent filaments having fiber diameters exceeding 3 μm be 50% or less. It is preferable that the percentages of the numbers of the constituent filaments having the predetermined fiber diameters be within these ranges among the filaments constituting the blended filament nonwoven fabric, because the collection performance is sufficient. In the use as a filter, it is preferable that the ratio of the number of constituent filaments having fiber diameters of 0.1 to 1.5 μm exceed 30%, and that the ratio of the number of constituent filaments having fiber diameters of 3 to 10 μm be less than 30%. Such a nonwoven fabric can be easily produced, for example, by a melt-blowing process by using two types of thermoplastic resins and using a spinneret in which spinning holes through which the two types of resins flow out are alternately arranged in a row, and by adjusting spinning conditions such as the discharge ratio of the two types of resins, the spinning temperature, and the temperature and pressure of compressed air.

The blended filament nonwoven fabric of the present invention is preferably a nonwoven fabric obtained by a melt-blowing process. The blended filament nonwoven fabric is obtained as follows. Specifically, the two types of thermoplastic resins are spun through a melt-blow spinneret for blending by melting and extruding the thermoplastic resins each independently. Moreover, the thermoplastic resins are melt-blow spun as ultrafine fiber flows with a high-temperature high-speed gas, and obtained as a blended filament nonwoven fabric on a collection apparatus. When the two types of filaments constituting the blended filament nonwoven fabric of the present invention are blended by a melt-blowing process, for example, a spinneret for blending can be used which is described in Description of Japanese Patent No. 3360377 and which has a structure in which spinning holes through which different resins flow out are alternately arranged in a single spinneret in a row.

In the blended filament nonwoven fabric of the present invention, the composition ratio of the filaments A1 and the filaments A2 is not particularly limited. In the use as a filter, one type of the filaments are preferably contained at 20 to 80% by mass, and further preferably at 35 to 65% by mass. When one type of the filaments are contained at 20% by mass or more, the collection efficiency and the specific volume are less likely to decrease, the spinnability is good, and the productivity does not deteriorate.

When the blended filament nonwoven fabric of the present invention is a fiber layer obtained by a melt-blowing process, a gas used for the melt-blow spinning in the melt-blowing process is generally an inert gas such as air or nitrogen gas. The temperature of the gas is approximately 200 to 500° C., and preferably approximately 250 to 450° C., while the pressure of the gas is approximately 9.8 to 588.4 kPa, and preferably approximately 19.6 to 539.4 kPa. The spinning conditions are set as appropriate depending on the physical properties and the combination of the resins used, the target fiber diameter, apparatuses such as a spinneret, and the like.

The specific volume of the blended filament nonwoven fabric of the present invention is not particularly limited, as long as the specific volume is 12 cm$^3$/g or more. In the use as a filter, the specific volume of the nonwoven fabric is preferably 15 cm$^3$/g or more, and further preferably 20 cm$^3$/g or more to suppress the increase in pressure loss during the use.

In the present invention, the thermoplastic resin constituting the filaments A1 in the blended filament nonwoven fabric and the thermoplastic resin constituting the filaments A2 therein are different thermoplastic resins. In selecting the different thermoplastic resins, it is preferable to select thermoplastic resins having different shear viscosities from each other. Particularly in a case where the filaments A1 and the filaments A2 are simultaneously spun by a direct nonwoven fabric production method such as a melt-blowing process using a spinneret for blending, the difference in shear viscosities of the thermoplastic resins enables fine fibers and coarse fibers to be uniformly blended, because the thermoplastic resin having the lower shear viscosity forms finer fibers. Hence, a nonwoven fabric having a specific volume of 12 cm$^3$/g or more can be obtained effectively. In general, the shear viscosity of a thermoplastic resin can be known by using, as an index, a shear viscosity measured by using a capillary rheometer (R6000 of IMATEK) at a temperature of 300° C. and at a shear rate of 10000 s$^{-1}$. Based on the shear viscosity, resins having different shear viscosities can be selected as the resins used for the filaments A1 and the filaments A2, respectively. Under a condition that the relationship represented by the shear viscosity of A2>the shear viscosity of A1 is satisfied, where A1 represents filaments obtained by using a resin having the lower shear viscosity, and A2 represents filaments obtained by using a resin having the higher shear viscosity, examples of specific combinations (A1/A2) of the thermoplastic resins include polypropylene/polypropylene, polypropylene/polyethylene, polypropylene/polyethylene terephthalate, polypropylene/polybutylene terephthalate, polypropylene/polylactic acid, polypropylene/polybutylene succinate, polyethylene/polyethylene terephthalate, polylactic acid/polybutylene succinate, propylene homopolymer/copolymer of propylene with one or two selected from ethylene and α-olefins, and the like.

The weight per unit area of the blended filament nonwoven fabric of the present invention is not particularly limited, and preferably 5 to 200 g/cm$^2$, more preferably 10 to 120 g/cm$^2$, and further preferably 20 to 60 g/cm$^2$. If the weight per unit area is 5 g/cm$^2$ or more, the blended filament nonwoven fabric can be obtained with a uniform texture. In addition, when the weight per unit area is 200 g/cm$^2$ or less, the bulk is less likely to decrease. In the use as a filter, the weight per unit area is preferably, but not limited to, in the range from 20 to 100 g/m$^2$, based on the conditions of use, the required pressure loss, and the required collection performance.

Since the blended filament nonwoven fabric of the present invention has a low pressure loss and a high collection efficiency, and since the increase in pressure loss is suppressed, the blended filament nonwoven fabric can be used as prefilters and filters of middle to high performance classes. In addition, for the same reasons, the blended filament nonwoven fabric of the present invention can be used as air filters used for long periods and mask filters used in places where dust is present in large amounts. Moreover, it is also possible to use the blended filament nonwoven fabric of the present invention in a state where multiple sheets thereof are stacked on each other.

In the use as an air filter, the blended filament nonwoven fabric of the present invention is preferably electret processed. Here, the electret process is a processing method in which a multilayer nonwoven fabric is electrically charged to provide characteristics such as collecting function to the multilayer nonwoven fabric. In this process, the multilayer nonwoven fabric is electrically charged by conducting an electret treatment such as a thermal electret method in which the electric charges are provided under an atmosphere heated to such an extent that the component having the lower melting point among the components of the filaments does not melt or a corona discharge method in which the electric charges are provided by corona discharge. Note, however, that the electret treatment method is not limited to these methods.

The blended filament nonwoven fabric of the present invention can be used as prefilters and air filters of medium to high performance HEPA classes used for air purifiers and air conditioners and as prefilters and main filters of surgical mask, particulate respirators, and the like. In addition, the blended filament nonwoven fabric of the present invention can be preferably used for general use masks and the like, depending on the required performance.

The blended filament nonwoven fabric of the present invention is preferably used after being integrated with another nonwoven fabric stacked on at least one surface of the blended filament nonwoven fabric. The method for stacking and integrating the nonwoven fabric of the present invention and another nonwoven fabric includes methods such as thermal bonding, chemical bonding, and hot melting, but the stacking and integrating method is not limited thereto.

When the blended filament nonwoven fabric of the present invention is used as a filter after being stacked on and integrated with another nonwoven fabric, it is preferable to maintain a high bulk to suppress the increase in pressure loss, and it is preferable that these fabrics are stacked and integrated by hot melting. When these fabrics are stacked and integrated by thermal bonding, the area of the bonded portion is preferably 0.5 to 20% of the area of the nonwoven fabric stacked in order to maintain a high bulk and to avoid impairment of air permeability. The area is further preferably 1 to 10%. If the area is 0.5% or more, the strength of the nonwoven fabric is not lowered, and the shape can be maintained during filter formation, pleating, and the like. If the area is 20% or less, the pressure loss does not increase too much, and hence the performance of the filter does not deteriorate.

The other nonwoven fabric stacked on and integrated with the blended filament nonwoven fabric of the present invention is not particularly limited, and includes spunbonded nonwoven fabrics, melt-blown nonwoven fabrics, resin-bonded nonwoven fabrics, thermal-bonded nonwoven fabrics, needle-punched nonwoven fabrics, spunlace nonwoven fabrics, and the like. In addition, it is also possible to use the blended filament nonwoven fabric of the present invention on which two or more other nonwoven fabrics are stacked.

When the multilayer nonwoven fabric is used as a filter, in which the blended filament nonwoven fabric serves as a main filter, the other nonwoven fabric preferably has a higher air permeability than the blended filament nonwoven fabric, because it is preferable not to impair the air permeability. In addition, it is preferable to arrange at least one other nonwoven fabrics on the air inlet side. The air permeability of the other nonwoven fabric is preferably 50 $cm^3/cm^2 \cdot sec$ or higher, more preferably 100 $cm^3/cm^2 \cdot sec$ or higher, and further preferably 200 $cm^3/cm^2 \cdot sec$ or higher. The weight per unit area is not particularly limited, and is preferably 10 to 300 $g/m^2$, more preferably 20 to 200 $g/m^2$, and further preferably 40 to 100 $g/m^2$, when the other nonwoven fabric is used as a reinforce of the blended filament nonwoven fabric. When the weight per unit area is 10 $g/m^2$ or higher, the effect of reinforcing the blended filament nonwoven fabric is so appropriate that the shape can be retained during pleating, mask formation, and the like. When the weight per unit area is 300 $g/m^2$ or less, the productivity is good during pleating and during mask formation.

When the multilayer nonwoven fabric in which the blended filament nonwoven fabric is stacked on the other nonwoven fabric and serves as a prefilter is used as a filter, and when the other nonwoven fabric is intended to serve as a coarse dust filter and also as a reinforce of the fabric, the other nonwoven fabric preferably has a higher air permeability than the blended filament nonwoven fabric, because it is preferable not to impair the air permeability. It is preferable to arrange at least one other nonwoven fabrics on the air inlet side. The air permeability of the nonwoven fabric is preferably 100 $cm^3/cm^2 \cdot sec$ or higher, more preferably 200 $cm^3/cm^2 \cdot sec$ or higher, and further preferably 400 $cm^3/cm^2 \cdot sec$ or higher. When the other nonwoven fabric is intended to serve as a main filter, the air permeability is not limited to the above-described range.

EXAMPLES

Hereinafter, the present invention is described based on Examples and Comparative Examples. However, the present invention is not limited to these examples. Note that, methods for measuring physical property values shown in Examples and Comparative Examples or definitions thereof are shown below.

Physical properties of nonwoven fabrics are described.

Fiber diameters: A small piece was cut from a nonwoven fabric; a photograph thereof was taken with a scanning microscope with a magnification of 2000 times to 5000 times; and the diameters (μm) of 400 or more filaments in total were measured with a vernier caliper or the like.

Average fiber diameter: An average fiber diameter (μm) was calculated by dividing the total value of the measured values of the filaments by the number of the constituent filaments.

Ratio of the number of constituent filaments: The ratio of the number of constituent fibers having diameters in each range was obtained by the following formulae.

The ratio (% by number) of the number of constituent filaments having fiber diameters of 0.1 to 3.0 μm=(the number of constituent filaments having fiber diameters of 0.1 to 3.0 μm/the total number of fibers)×100

The ratio (% by number) of the number of constituent filaments having fiber diameters exceeding 3.0 μm=(the number of constituent filaments having fiber diameters exceeding 3.0 μm/the total number of fibers)×100

The ratio (% by number) of the number of constituent filaments having fiber diameters of 0.1 to 1.5 μm=(the number of constituent filaments having fiber diameters of 0.1 to 1.5 μm/the total number of fibers)×100

The ratio (% by number) of the number of constituent filaments having fiber diameters of 3.0 to 10 μm=(the number of constituent filaments having fiber diameters of 3.0 to 10 μm/the total number of fibers)×100

Weight per unit area: The entire weight of a formed article obtained by cutting a nonwoven fabric into a 25 cm square was measured, and expressed in terms of weight per unit area (g/m²).

Thickness: The thickness (mm) was measured according to JIS L1913 (6.1.1A):2010 with DIGI THICKNESS TESTER (Toyo Seiki Seisaku-sho, Ltd.).

Specific volume (cm³/g): The specific volume was obtained by the following formula.

Specific volume (cm³/g)=Thickness (mm)/Weight per unit area (g/m²)×1000

Air permeability: The air permeability (cm³/cm²/sec) was measured according to JIS L1913:2010 (6.8.1).

Melt mass flow rate: The melt mass flow rate was measured according to JIS K 7210:1999. MI was a value measured according to Conditions D (test temperature: 190° C., load: 2.16 kg) shown on Table 1 of Annex A. Meanwhile, MFR was a value measured according to Conditions M (test temperature: 230° C., load: 2.16 kg).

Filter performance tests are shown.

Pressure loss (Pa): The pressure loss occurring when NaCl (particle diameter: 0.07 μm (count median diameter), particle concentration: 10 to 25 mg/m³) was passed through a sample at a measurement flow rate of 40 L/min (measurement area: 128.5 cm²) was measured with an automatic filter efficiency detector (Model 8130 manufactured by TSI). A lower value indicates that air can pass through the sample more easily. Hence, a lower value is preferable because the pressure loss is low.

Collection efficiency (%): The collection efficiency achieved when NaCl (particle diameter: 0.07 μm (count median diameter), particle concentration: 10 to 25 mg/m³) was passed through a sample at a measuring flow rate of 85 L/min (measurement area: 128.5 cm²) was measured with an automatic filter efficiency detector (Model 8130 manufactured by TSI).

Amount (mg) of NaCl loaded at a pressure loss of 100 Pa: With an automatic filter efficiency detector (Model 8130 manufactured by TSI), NaCl (particle diameter: 0.07 μm (count median diameter), particle concentration: 10 to 25 mg/m³) was passed through a sample at a measuring flow rate of 85 L/min (measurement area: 128.5 cm²). The amount of NaCl at the time when the pressure loss reached 100 Pa was obtained by the following formula.

The amount (mg) of NaCl loaded at a pressure loss of 100 Pa=the weight (mg) of the sample before the measurement−the weight (mg) of the sample after the measurement A higher value indicates that the increase in pressure loss is more suppressed, and the collection performance is higher.

Thermoplastic resins used in Examples and Comparative Examples were as follows.

Polypropylene: propylene homopolymer, MFR: 80 g/10 min (230° C.), melting point: 160° C., shear viscosity: 6.5 Pa·s (measuring temperature: 300° C., shear rate: 10000 s$^{-1}$)

Polyethylene: high-density polyethylene, MI: 40 g/10 min (190° C.), melting point: 125° C., shear viscosity: 15.5 Pa·s (measuring temperature: 300° C., shear rate: 10000 s$^{-1}$)

Polyethylene terephthalate: polyethylene terephthalate, melting point: 240° C., shear viscosity: 34.3 Pa·s (measuring temperature: 300° C., shear rate: 10000 s$^{-1}$)

Example 1

Raw materials used were the polypropylene serving as a filament A1 component of a nonwoven fabric and the polyethylene serving as a filament A2 component of the nonwoven fabric. A blended filament nonwoven fabric was produced by using a melt-blown nonwoven fabric production apparatus including two extruders each having a screw (50 mm in diameter), a heater, and a gear pump, a spinneret for blending (hole diameter: 0.3 mm, number of holes: 501 holes for discharging fibers of different components were alternately arranged in a row, effective width: 500 mm), a compressed air generator, an air heater, a collection conveyor equipped with a polyester net, and a winder.

The raw material resins were introduced into the extruders, respectively, and melted by heating the polypropylene to 230° C. and the polyethylene to 270° C. with the heaters. The gear pumps were set so that the polypropylene/polyethylene weight ratio could be 50/50, and the molten resins were discharged through the spinneret at a spinning rate of 0.3 g/min per hole. The discharged filaments were blown with compressed air heated to 400° C. at a pressure of 85 kPa (gauge pressure) onto a polyester conveyor set 25 cm away from the spinneret, with the velocity of the collection conveyor being adjusted thereto. Thus, a nonwoven fabric was obtained. The obtained nonwoven fabric was held under an atmosphere of 80° C. for 1 minute, and then a voltage of −10 kV was applied thereto for 5 seconds. Thus, an electret-processed blended filament nonwoven fabric was obtained.

Example 2

A nonwoven fabric was obtained by the same method as in the production of the blended filament nonwoven fabric of Example 1, except that the polypropylene/polyethylene weight ratio was changed to 60/40, and the pressure of the compressed air was changed to 95 kPa. An electret-processed blended filament nonwoven fabric was obtained by holding the obtained nonwoven fabric under an atmosphere of 100° C. for 2 minutes and then applying a voltage of −10 kV thereto for 5 seconds.

Example 3

A nonwoven fabric was obtained by the same method as in the production of the blended filament nonwoven fabric of Example 1, except that the polyethylene terephthalate was used as the A2 component and melted by heating at 300° C. An electret-processed blended filament nonwoven fabric was obtained by holding the obtained nonwoven fabric under an atmosphere of 100° C. for 2 minutes and then applying a voltage of −10 kV thereto for 5 seconds.

Example 4

A nonwoven fabric was obtained by the same method as in the production of the blended filament nonwoven fabric of Example 1, except that the pressure of the compressed air was changed to 75 kPa, and the velocity of the conveyor was adjusted thereto. An electret-processed blended filament nonwoven fabric was obtained by holding the obtained nonwoven fabric under an atmosphere of 100° C. for 2 minutes and then applying a voltage of −10 kV thereto for 5 seconds.

Example 5

A nonwoven fabric was obtained by the same method as in the production of the blended filament nonwoven fabric of Example 1, except that the polypropylene/polyethylene weight ratio was changed to 70/30, and the pressure of the compressed air was changed to 65 kPa. An electret-processed blended filament nonwoven fabric was obtained by holding the obtained nonwoven fabric under an atmosphere of 100° C. for 2 minutes and then applying a voltage of −10 kV thereto for 5 seconds.

Comparative Example 1

A nonwoven fabric was obtained by the same method as in the production of the blended filament nonwoven fabric of Example 1, except that the polypropylene was used as the A2 component and melted by heating at 230° C. An electret-processed blended filament nonwoven fabric was obtained by holding the obtained nonwoven fabric under an atmosphere of 100° C. for 2 minutes and then applying a voltage of −10 kV thereto for 5 seconds.

Comparative Example 2

A nonwoven fabric was obtained by the same method as in the production of the blended filament nonwoven fabric of Comparative Example 1, except that the pressure of the compressed air was changed to 60 kPa. An electret-processed blended filament nonwoven fabric was obtained by holding the obtained nonwoven fabric under an atmosphere of 100° C. for 2 minutes and then applying a voltage of −10 kV thereto for 5 seconds.

Comparative Example 3

A nonwoven fabric was obtained by the same method as in the production of the blended filament nonwoven fabric of Comparative Example 1, except that the pressure of the compressed air was changed to 75 kPa, and the velocity of the conveyor was adjusted thereto. An electret-processed blended filament nonwoven fabric was obtained by holding the obtained nonwoven fabric under an atmosphere of 100° C. for 2 minutes and then applying a voltage of −10 kV thereto for 5 seconds.

Table 1 shows the resin composition, the specific volume, and the fiber diameter distribution of each of Examples and Comparative Examples.

TABLE 1

| | | Example | | | | | Comparative Example | | |
|---|---|---|---|---|---|---|---|---|---|
| | | 1 | 2 | 3 | 4 | 5 | 1 | 2 | 3 |
| Blended filament nonwoven fabric | Filament A1 | PP | PP | PP | PP | PP | PP | PP | PP |
| | Filament A2 | PE | PE | PET | PE | PE | PP | PP | PP |
| A1/A2 composition ratio, % by mass | | 50/50 | 60/40 | 50/50 | 50/50 | 70/30 | 50/50 | 50/50 | 50/50 |
| Weight per unit area, g/m$^2$ | | 32.7 | 32.4 | 33.7 | 52.4 | 34.5 | 28.9 | 31.1 | 51.2 |
| Thickness, mm | | 0.77 | 0.79 | 0.72 | 0.88 | 0.91 | 0.26 | 0.27 | 0.35 |
| Specific volume, cm$^3$/g | | 23.5 | 24.4 | 21.4 | 16.8 | 31.7 | 9.0 | 8.8 | 6.8 |
| Average fiber diameter, μm | | 2.1 | 2.1 | 2.3 | 2.9 | 4.2 | 1.9 | 3.2 | 2.6 |
| Percentage of the number of constituent filaments of 0.1 to 3 μm | | 77.8 | 77.5 | 72.1 | 57.6 | 43.0 | 92.2 | 80.5 | 85.3 |
| Percentage of the number of constituent filaments exceeding 3 μm | | 22.2 | 22.5 | 27.9 | 42.4 | 57.0 | 7.8 | 19.5 | 14.7 |
| Percentage of the number of constituent filaments of 0.1 to 1.5 μm | | 43.1 | 35.3 | 49.1 | 31.1 | 12.0 | 75.1 | 50.2 | 65.5 |
| Percentage of the number of constituent filaments of 3 to 10 μm | | 22.5 | 22.5 | 23.1 | 42.2 | 57.6 | 7.8 | 19.5 | 15.0 |

Note that, in Table 1, the resins are denoted as follows.

PP (abbreviation of polypropylene), PE (abbreviation of polyethylene), PET (abbreviation of polyethylene terephthalate)

Table 2 shows filter characteristics of the nonwoven fabrics of Examples 1 to 5 and Comparative Examples 1 to 3, namely, the pressure loss, the collection efficiency, and the amount of NaCl loaded at the time point when the pressure loss increased to 100 Pa.

TABLE 2

| | Example | | | | | Comparative Example | | |
|---|---|---|---|---|---|---|---|---|
| | 1 | 2 | 3 | 4 | 5 | 1 | 2 | 3 |
| pressure loss (Pa) | 12.4 | 13.7 | 16.4 | 18.8 | 8.5 | 42.7 | 27.5 | 37.2 |
| Collection efficiency (%) | 78.3 | 70.5 | 86.7 | 90.4 | 60.2 | 99.9 | 78.0 | 95.8 |
| Amount of NaCl loaded at pressure loss of 100 Pa (mg) | 188 | 239 | 138 | 105 | 77 | 3 | 23 | 4 |

As can be understood from Tables 1 and 2, the blended filament nonwoven fabric of the present invention has a low pressure loss and a high collection efficiency, and the increase in pressure loss can be suppressed for a long period. Because of the low pressure loss, the high collection efficiency, and the small increase in pressure loss, the blended filament nonwoven fabric of the present invention can be used as prefilters and filters of middle to high performance classes.

INDUSTRIAL APPLICABILITY

A filter using the blended filament nonwoven fabric of the present invention makes it possible to provide an air filter for an air conditioner and a filter for an air purifier which can be used economically for a long period. In addition, the blended filament nonwoven fabric of the present invention makes it possible to provide masks which enable smooth breathing even when worn for long periods and which are used as masks for medical use or for pollen or as particulate respirators used in places where dust is present in large amounts.

The invention claimed is:

1. A blended filament nonwoven fabric, comprising a blend of two types of filaments, wherein
the two types of filaments are constituted of thermoplastic resins different from each other, wherein the thermoplastic resins have different shear viscosities, and a difference in the shear viscosities, which is obtained by dividing a higher shear viscosity value by a lower shear viscosity value, is 1.5 times or more,
an average fiber diameter obtained by dividing the total value of fiber diameters of the filaments present in the nonwoven fabric by the number of the constituent filaments is 0.1 to 10 μm, the ratio of the number of constituent filaments having fiber diameters of 0.1 to 1.5 μm exceed 30%, and that the ratio of the number of constituent filaments having fiber diameters of 3 to 10 μm be less than 30%, and
the nonwoven fabric has a specific volume of 20 cm$^3$/g or more.

2. The blended filament nonwoven fabric according to claim 1, wherein the ratio of the number of constituent filaments having fiber diameters of 0.1 to 3 μm is 50% or more of the filaments constituting the nonwoven fabric.

3. The blended filament nonwoven fabric according to claim 1, wherein the nonwoven fabric is produced by a melt-blowing process.

4. The blended filament nonwoven fabric according to claim 1, wherein the two types of filaments are each mainly constituted of a polyolefin.

5. The blended filament nonwoven fabric according to claim 1, wherein the two types of filaments are filaments mainly constituted of a polyolefin and filaments mainly constituted of a polyester.

6. A filter obtained by using the blended filament nonwoven fabric according to claim 1.

7. An air filter obtained by electret-processing the blended filament nonwoven fabric according to claim 1.

8. A filter comprising:
the filter according to claim 6; and
another nonwoven fabric stacked on at least one surface of the filter or the air filter and integrated with the filter.

9. The blended filament nonwoven fabric according to claim 2, wherein the nonwoven fabric is produced by a melt-blowing process.

10. A filter comprising:
the air filter according to claim 7; and
another nonwoven fabric stacked on at least one surface of the filter or the air filter and integrated with the air filter.

11. The blended filament nonwoven fabric according to claim 1, wherein the blended filament nonwoven fabric has a pressure loss of 16.4 MPa or less, the pressure loss being measured with an automatic filter efficiency detector when NaCl is passed through a filter obtained by using the blended filament nonwoven fabric at a measurement flow rate of 40 L/min, the NaCl having a count median particle diameter of 0.07 μm and a particle concentration of 10 mg/m$^3$ to 25 mg/m$^3$.

* * * * *